United States Patent [19]

Dearman

[11] Patent Number: 4,463,938

[45] Date of Patent: Aug. 7, 1984

[54] INTERNAL CLAMPING OF PIPES

[76] Inventor: Timothy C. Dearman, P.O. Box 937, Pearland, Tex. 77581

[21] Appl. No.: 362,908

[22] Filed: Mar. 29, 1982

[51] Int. Cl.³ ............................................. B23Q 3/14
[52] U.S. Cl. .................................................. 269/48.1
[58] Field of Search .......................... 269/43, 45, 48.1; 228/49 B, 44.5; 29/271, 272

[56] References Cited

U.S. PATENT DOCUMENTS

| | | | |
|---|---|---|---|
| 2,741,206 | 4/1956 | Stevenson | 269/48.1 |
| 3,031,994 | 5/1962 | Clark | 269/48.1 |
| 3,561,320 | 2/1971 | Nelson | 269/48.1 |
| 3,711,938 | 1/1973 | Warren et al. | 228/44.5 |

FOREIGN PATENT DOCUMENTS 797021  6/1958  United Kingdom ................. 269/45

Primary Examiner—Robert C. Watson
Attorney, Agent, or Firm—Learman & McCulloch

[57] ABSTRACT

An internal clamp mechanism for use in welding two pipes together in end to end prolongation has a pair of axially spaced, parallel, radially expansible and contractile clamp members coupled to one another in such manner as to enable one of the clamp members to be shifted bodily transversely of the other. Shifting of the one clamp member is effected by a plurality of fluid pressure rams operable independently of one another. The ability of the one clamp member to be shifted transversely of the other enables the pipe accommodating the shiftable clamp member to be axially aligned with the other pipe and to distribute any difference in wall thickness between the two pipes over the entire circumference thereof.

23 Claims, 7 Drawing Figures

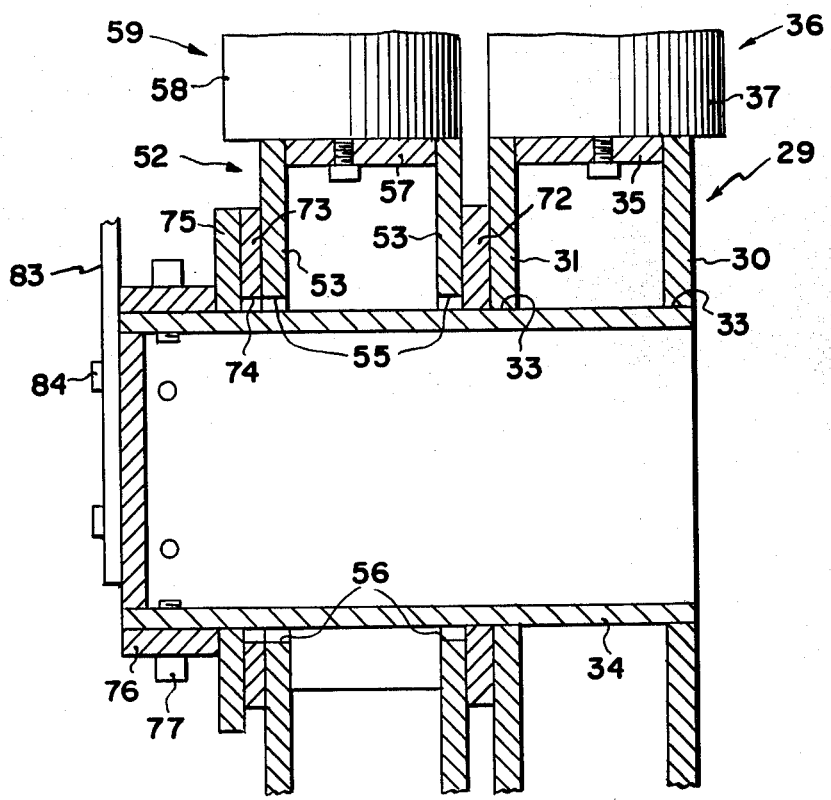
FIG.5
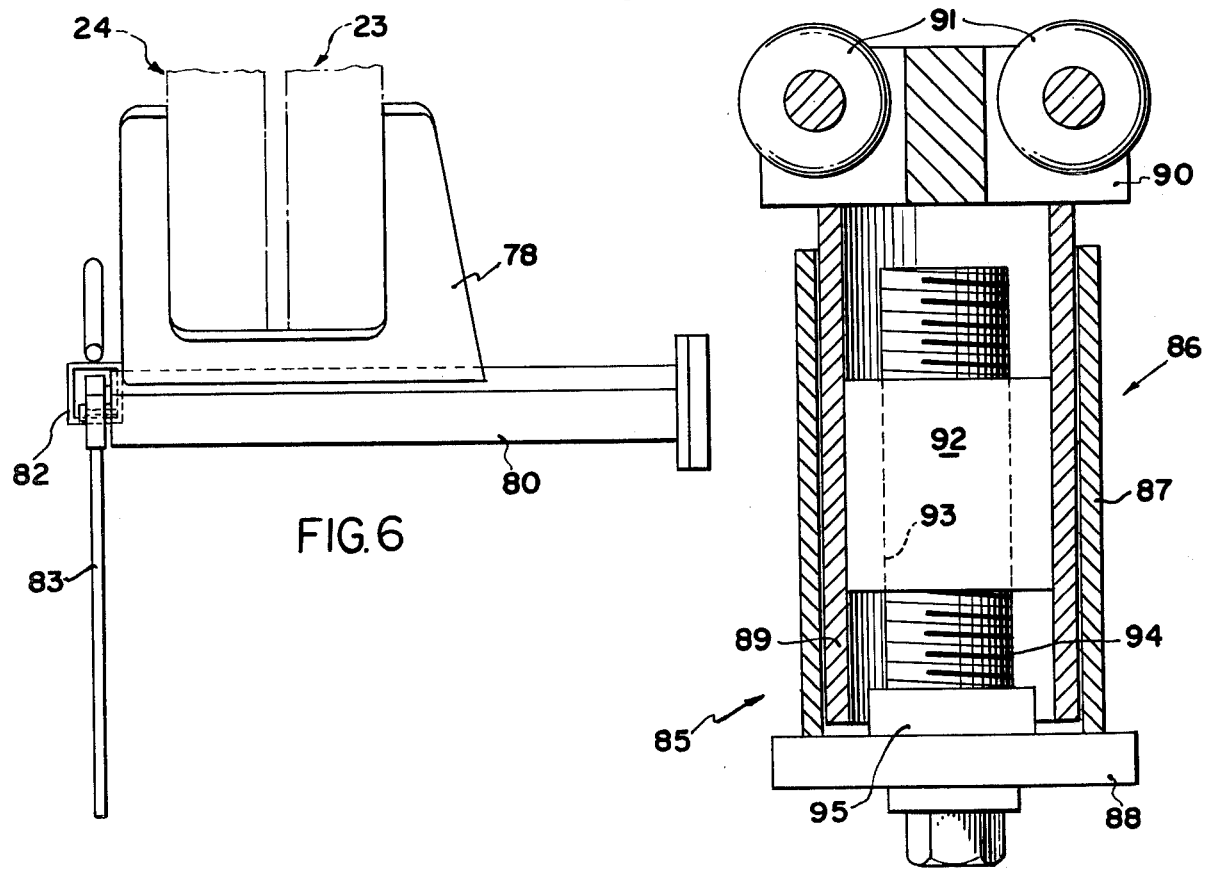
FIG.6
FIG.7

INTERNAL CLAMPING OF PIPES

BACKGROUND OF THE INVENTION

In the welding of lengths of pipe to one another to form a large diameter pipeline it is conventional to make use of an internal clamp mechanism and to position it adjacent the free end of a first pipe with a portion of the clamp extending beyond the free end of the pipe so as to be accommodated within a second pipe that is to be welded to the first pipe in axial alignment therewith. The internal clamp mechanism conventionally has two sets of axially spaced, circumferentially arranged clamp members which may be expanded into forcible engagement with the inner surfaces of the first and second pipes adjacent their confronting ends so as to reform the confronting ends of the two pipes into matching configurations, following which the pipes are welded to one another. After completion of the welding operation, the clamp members are contracted, thereby enabling the clamp mechanism to be moved longitudinally of the second pipe toward the free end thereof in readiness to join thereto a third pipe.

In those instances in which an internal clamp is precisely aligned with the longitudinal axes of two pipes and wherein the confronting ends of the two pipes are of uniform diameter and of uniform wall thickness, satisfactory welds can be made. It is extremely rare, however, that the wall thicknesses of two confronting pipes are uniform, especially in pipes having diameters of five feet, more or less, and it is more common than not for the longitudinal axis of the clamp to be somewhat misaligned with the longitudinal axis of one or both of the pipes that are to be joined together. As a result, it is rare indeed, in field operations, for one length of pipe to have its longitudinal axis in perfect alignment with the longitudinal axis of the pipe to which it is joined. More often than not, the axis of one pipe will be offset laterally to one side of the longitudinal axis of the adjacent pipe, as a consequence of which a step exists at the joint between the two pipes. Thus, on the inside of the pipe joint there is a non-uniform condition known as high-low, or simply hi-lo, which is most undesirable and often results in the necessity of having to reweld the joint at substantial expense. To avoid the need for rewelding as much as possible, an inordinate amount of time currently is consumed in attempting to match the confronting ends of two pipes that are to be welded together, thereby adding considerably to the cost of forming pipelines.

SUMMARY OF THE INVENTION

The welding together of two lengths of pipe is accomplished according to the present invention by fitting into the two pipes and adjacent the joint therebetween an internal pipe clamp mechanism having two axially spaced, independently operable clamp members which are radially expansible into forcible engagement with the inner surfaces of the two pipes adjacent their confronting ends. The expansion of the ring members is effected by hydraulic rams which operate through a force multiplying toggle linkage by means of which sufficient force can be applied on the respective pipes to reform their ends into matching configurations. One of the clamp members is radially adjustable bodily of the other ring member so as to effect transverse, bodily shifting of one pipe relative to the other. The ability of one pipe to be shifted transversely of the other enables any difference between the wall thicknesses of the two pipes to be compensated for by distributing the difference over the entire circumference, thereby establishing the least possible step and hi-lo condition at the joint between the two pipes and positioning the two pipes with their longitudinal axes aligned. Following the welding operation the clamp members may be contracted radially, thereby conditioning the clamp mechanism for movement through the pipeline to a position in which it again may be used for welding another section of pipe to the pipeline.

DESCRIPTION OF THE DRAWINGS

Apparatus constructed in accordance with a preferred embodiment of the invention is disclosed in the accompanying drawings wherein:

FIG. 5 is a sectional view taken on the line 5—5 of FIG. 3;

FIG. 6 is a side elevational view of a guide member, as viewed generally along the line 6—6 of FIG. 3; and FIG. 7 is a sectional view, on a greatly enlarged scale, taken on the line 7—7 of FIG. 1.

THE PREFERRED EMBODIMENT

Figure 1:
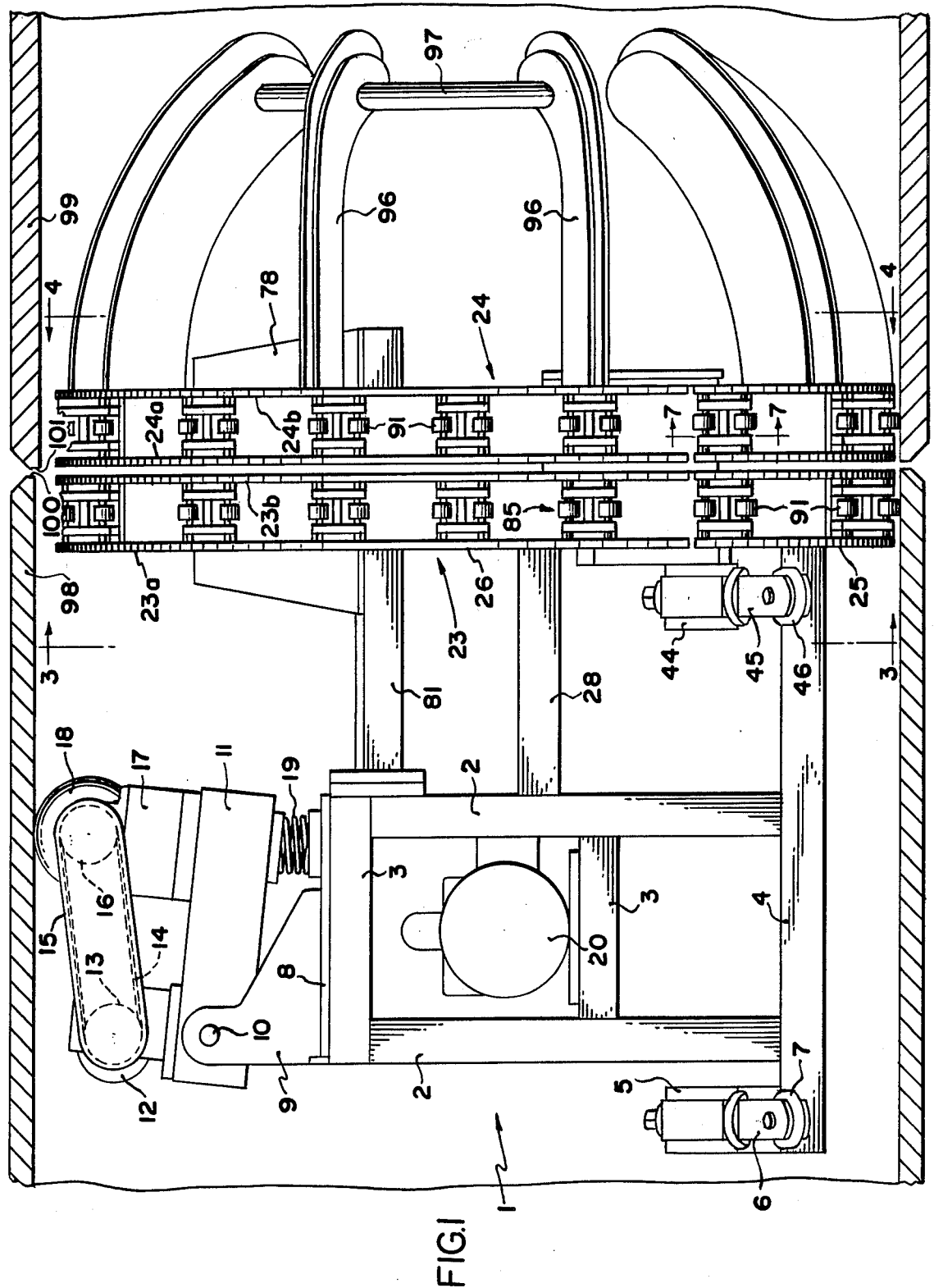
FIG. 1 is a side elevational view of the internal pipe clamp mechanism positioned within a pair of confronting pipes, the latter being shown fragmentarily and in section.

An internal clamp mechanism constructed according to the invention comprises a carriage 1 having a frame composed of a plurality of uprights 2 joined by cross bars 3. The frame also includes a pair of lower stringers 4 which extend forwardly and rearwardly beyond the uprights 2 and provide support, at their rear ends, for brackets 5 in each of which is mounted a longitudinally adjustable stem 6 at the lower, free end of which is journaled a rotary wheel 7 in a known manner.

Atop the upper cross bars 3 is a plate 8 supporting a bracket 9 on which is pivoted, as at 10, a mounting block 11. Mounted on the block 11 is a preferably hydraulic motor 12 having a driven sprocket wheel 13 around which is trained a drive chain 14 housed within a guard 15. The drive chain also is trained around a wheel 16 journaled in a support block 17 and to which is fixed a driving wheel 18. The driving wheel 18 normally is urged counterclockwise about the axis of the pivot 10 by means of a powerful compression spring 19 which reacts between the plate 8 and the mounting block 11. The driving wheel thus is capable of frictionally engaging the inner surface of a pipe.

Figure 2:
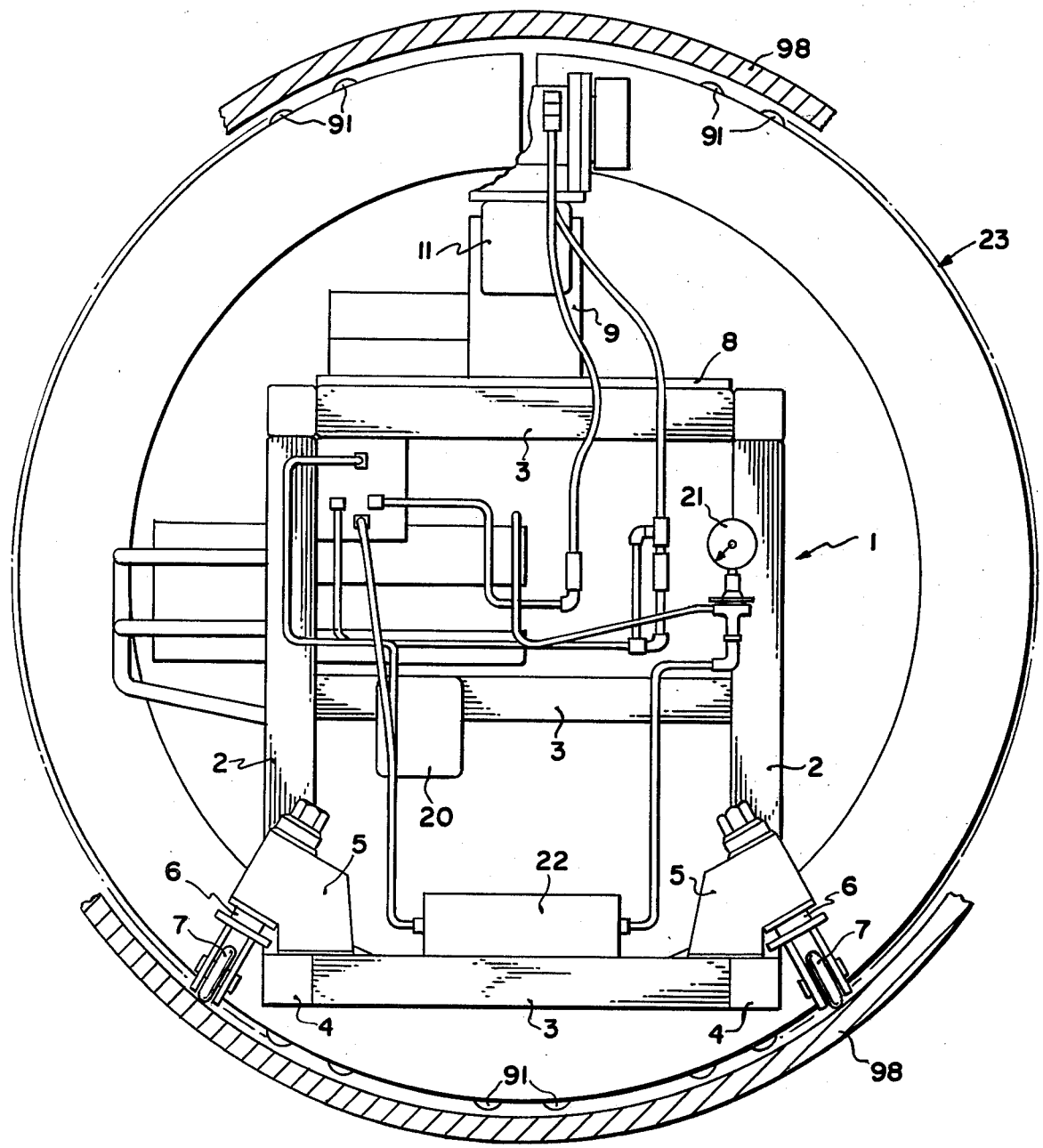
FIG. 2 is a rear end elevational view of the clamp and fragmentarily illustrating in cross section a length of pipe within which the clamp is located.

A hydraulic pump 20 is coupled to the motor 12 via suitable hydraulic lines, valves, and a pressure gauge as shown in FIG. 2. A hydraulic fluid reservoir 22 also is provided for supplying hydraulic fluid to the motor 12 and to other hydraulic apparatus to be described hereinafter.

Adjacent the forward end of the carriage 1 is a pair of clamp members 23 and 24. The clamp members will be described in more detail subsequently, but for the present it will suffice to state that both of them are radially expansible and contractile and that the clamp member 24 is capable of floating, bodily adjustment relative to the clamp member 23.

The clamp member 23 comprises three arcuate segments 25, 26 and 27 (see FIG. 3) and each segment is composed of a pair of spaced, parallel, arcuate arms 23a and 23b. The segment 25 is welded or otherwise suitably fixed to the forward ends of the frame stringers 4.

Another pair of frame stringers 28 extends forwardly from the frame members 2 and 3 and are welded at their forward ends to a clamp support 29 composed of a pair of spaced, parallel plates 30 and 31. The spacing between the plates 30 and 31 corresponds to the spacing between the arcuate arms 23a and 23b, and each of the plates has a pair of legs 32 (FIG. 3) which are welded to the corresponding arms of the segment 25. The segment 25, therefore, is fixed against movement relative to the carriage 1 and is carried by the latter.

Each of the plates 30, 31 of the support 29 has an opening 33 in which is welded or otherwise suitably fixed a tubular coupling member 34 which projects forwardly well beyond the forwardmost plate 31 to enable the clamps 23 and 24 to be coupled to one another in a manner to be described.

Spanning the support plates 30 and 31 at their upper edges is a spacer 35 and on which is fixed one end of a hydraulic ram 36 comprising a cylinder 37 within which is a vertically reciprocable piston rod 38. Hydraulic fluid is admitted to and withdrawn from the cylinder 37 via suitable lines (not shown) under the control of the pump 20 and valves. The free end of the piston rod 38 is fitted to a head 39 which is coupled to the clamp segments 26 and 27 by force multiplying toggle linkages 40 and 41.

The clamp segments 26 and 27 of the clamp 23 have straps 42 welded to the respective segments and which span the gaps between the segment 25 and the adjacent ends of the segments 26 and 27. The straps 42 are pivoted as at 43 to the segment 25 and each strap has an extension 44 at the free end of which is mounted an adjustable stem 45 in which is journaled a roller 46. There is no connection between the adjacent ends of the segments 26 and 27. As a consequence, the confronting ends of such segments may move toward and away from each other.

Figure 3:
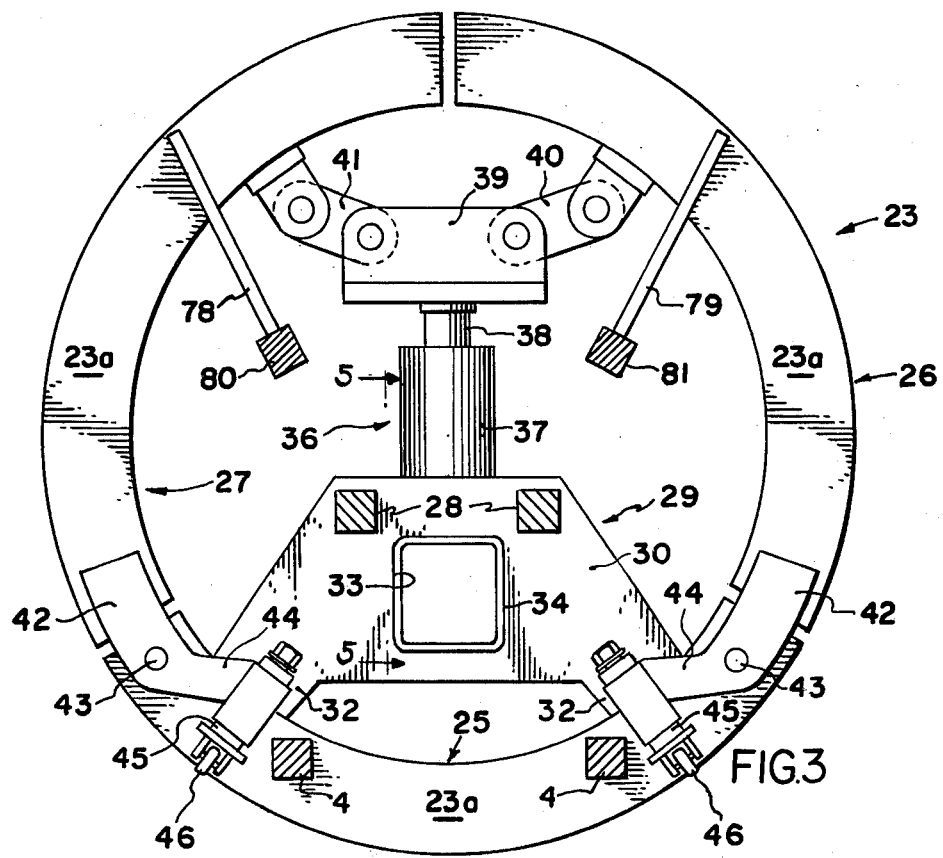
FIG. 3 is a sectional view taken on the line 3—3 of FIG. 1.

The construction of the clamp 23 is such that, upon the extension of the ram 36 from the position shown in FIG. 3, the head 39 will move upwardly, thereby causing the inboard ends of the toggle links 40 and 41 to move upwardly toward a more horizontal position. As the inboard ends of the links 40 move upwardly, their outboard ends will exert forces on the segments 26 and 27 to rock them in opposite directions about their pivots 43, thus expanding the clamp member 23 radially. As the segments 26 and 27 rock about the pivots 43, the rollers 46 also will rock about such pivots to positions in which they are retracted radially inwardly of the outer arcuate edge of the segment 25. The significance of this will be explained subsequently.

The clamp member 24 is composed of three arcuate segments 47, 48 and 49 separated from one another by gaps. Each segment is composed of spaced, parallel, arcuate arms 24a and 24b. The segments 48 and 49 are provided with straps 50 fixed thereto and pivoted as at 51 to the segment 47. No connection exists between the confronting end of the segments 48 and 49, thereby enabling such ends to move toward and away from one another.

The clamp member 24 includes a support 52 similar to the support 29 and composed of spaced, parallel plates 53 having legs 54 welded to the arms 24a and 24b of the segment 47. The support 52 also has an opening 55 in each plate 53 and through which the tubular member 34 projects. The openings 55 in the support plates 53, however, have a greater area than that of the member 34 so that an annular gap 56 exists between the member 34 and each of the plates 53. Although the size of the gap 56 may vary, it is rare that it needs to be more than one-half to three-fourths inch.

The individual plates 53 of the support 52 are spanned at their upper ends by a spacer 57 on which is fixed one end of a hydraulic ram 58 having a cylinder 59 within which is a piston rod 60 to which is fixed a head 61 that is coupled by toggle links 62 and 63 to the arcuate clamp segments 48 and 49. The ram is supplied with hydraulic fluid from the reservoir 22 via suitable lines, not shown, under the influence of the pump 20 and valves. Extension of the ram 58 causes radial expansion of the clamp member 24 by effecting pivotal movement of the segments 48 and 49 about their respective pivots 51, in a manner similar to that in which the clamp 23 is expanded.

The rams 36 and 58 are operable independently of each other so as to enable independent radial expansion and contraction of the respective clamps.

Means designated generally by the reference character 64 (FIG. 4) is provided for effecting bodily shifting movements of the clamp member 24 transversely of the longitudinal axes of the clamp members 23 and 24. The shifting means comprises a pair of anchor members 65 and 66 welded or otherwise suitably fixed to the support 53 and a pair of extensible and retractable hydraulic rams 67 and 68 pivoted at corresponding ends to the anchor members 65 and 66 and at their opposite ends to brackets 69 and 70 fixed to the segment 47. The rams 67 and 68 also are supplied with hydraulic fluid from the reservoir 22 by means of fluid lines, not shown, via the pump 20 and suitable valves.

Figure 4:
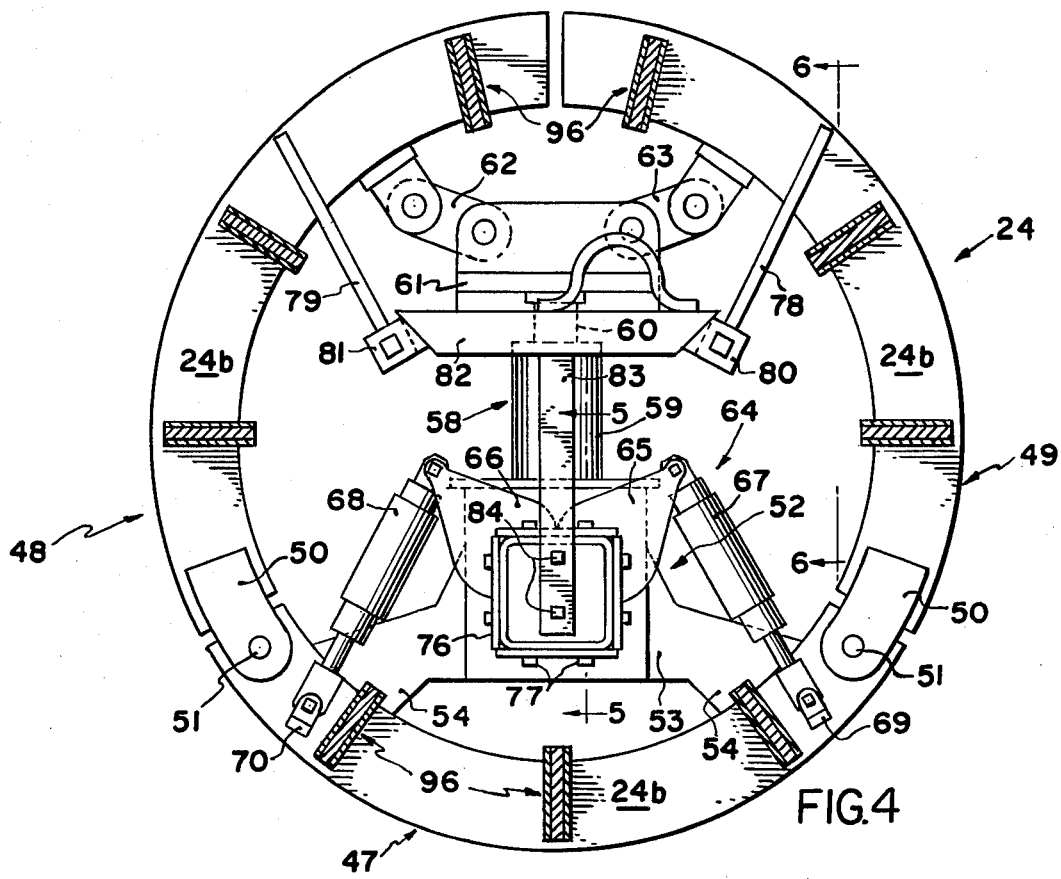
FIG. 4 is a sectional view taken on the line 4—4 of FIG. 1.

The arrangement of the support 52 and the rams 67, 68 is such that, upon conjoint extension of the rams 67 and 68, the clamp member 24 may be moved vertically downwardly, as viewed in FIG. 4, until the gap 56 between the support 52 and the upper surface of the coupling 34 is eliminated. Upward vertical movement of the clamp member 24 is effected by conjoint retraction of the rams 67 and 68, whereas movements of the clamp member 24 to the left and to the right may be effected by extension or retraction of one of the rams 67 and 68 or by simultaneous extension of one ram and retraction of the other. Thus, the clamp member 24 is capable of movement transversely of the clamp member 23 in all directions, and the extent of such movement is limited only by the size of the gap 56 and the stroke length of the rams.

It is preferred that the clamp members 23 and 24 remain parallel at all times. This is assured by the provision of a guide plate 72 (FIG. 5) fitted between the supports 29 and 52 and secured either to the coupling member 34 or to the forward support plate 31. A guide plate 73 also is secured to the forward plate 53 of the support 52 and is provided with an opening 74 corresponding to the size of the openings 55. The guide 73 bears against a wear plate 75 which is fixed to a retainer 76 that is secured to the forward end of the member 34 by bolts 77 or the like.

The clamps 23 and 24 also are maintained parallel by two U-shaped guide members 78 and 79 in which the clamps slideably are accommodated. The guide members are carried by frame bars 80 and 81 secured at their rear ends to the frame members 2 and 3 and at their forward ends to a cross bar 82 that is stabilized by a brace 83 secured to the member 34 by bolts 84.

In the preferred embodiment of the invention each of the clamp members 23 and 24 has a plurality of radially adjustable, force applying members 85 interposed between the parallel arms of the respective clamp members. Each member 85 comprises a telescopic body 86 having an external sleeve 87 closed at one end by a cap 88. Slideably accommodated within the sleeve is a tubular body 89 to which is fixed a head 90 in which is journaled a pair of rollers 91. Secured within the inner body 89 is a nut-like member 92 having a threaded bore 93 therethrough. An adjusting screw 94 extends through the bore 93 and through a correspondingly threaded nut 95 which is fixed to the cap 88. The arrangement is such that rotation of the adjusting screw 94 in opposite directions causes radially outward and inward movements of the rollers 91.

The members 85 not only function to mount the rollers 91 for radial adjustment, but also serve as means for maintaining the spacing between and the parallelism of the individual arms from which the segments of the clamp members 23 and 24 are formed. Thus, the outer body members 87 may be welded to and between the plates 24a, 24b, for example, so as to maintain them parallel and joined.

Projecting forwardly from the floating clamp member 24 is a plurality of curved guide fingers 96. Each of the fingers 96 is welded at its rearward end to a segment of the clamp member 24 and the fingers fixed to each individual segment are stablized by bars 97 connecting their forward ends. The fingers 96 affixed to adjacent segments are not coupled to one another, however, for to do so could interfere with radial expansion and contraction of the clamp member 24.

To condition the apparatus for use, the clamp members 23 and 24 are contracted radially, thereby enabling the rollers 46 to be thrust outwardly so that they, together with the rollers 7, provide rolling support for the carriage when the latter is introduced, utilizing a crane or the like, into a large diameter pipe 98 to which another pipe 99 of substantially corresponding diameter is to be welded. The diameter of the pipes should be such as to accommodate the entire clamp assembly, with relatively small clearance between the clamps 23 and 24 and the inner surfaces of the pipes when the clamps are contracted. The clamp member 24 should be adjusted, by manipulation of the rams 67 and 68, so that it is coaxial with the clamp member 23. The carriage 1 then may be driven along the length of the pipe 98 toward its free end 100 by rotation of the driving wheel 18. It will be understood that a suitable control unit will be provided for use by an operator to control the operation of the pump 20 and the several hydraulic units and valves of the assembly.

The carriage is stopped in a position in which the clamp member 23 is adjacent but slightly inward of, the free end 100 of the pipe 98. The clamp member 24, together with the guide fingers 96, therefore, will project beyond the free end of the pipe 98. The pipe 99, supported by a crane, rollers, or other suitable means (not shown), then may be moved toward the pipe 98 so as to fit over the guide fingers 96 and the clamp member 24 and be positioned with its free end 101 slightly spaced from, but confronting the end 100 of the pipe 98 and extending in prolongation thereof.

The wall thickness of the pipe 99 illustrated in FIG. 1 is greater than that of the pipe 98 and the disclosed match-up between the two pipes 98 and 99 is such that the inner surface of the pipe 99 at the upper side thereof is lower than that of the inner surface of the pipe 98. At the bottom of the two pipes, however, the inner surfaces of the pipes 98 and 99 are disclosed as being coplanar, with the result that the outer surface of the pipe 99 is at a level lower than that of the outer surface of the pipe 98. The illustration in FIG. 1, therefore, indicates not only non-uniform wall thicknesses of the two pipes, but also nonconformity of their confronting ends. If the two pipes were to be welded together in their illustrated positions, a hi-lo condition would exist around virtually the entire circumference of the two pipes, and the longitudinal axes of the two pipes would not be aligned. Thus, such a weld could be unacceptable.

Following positioning of the two pipes 98 and 99 end to end in the manner shown in FIG. 1 (or before placing the pipe 99 adjacent the pipe 98, if desired), the clamp 23 may be expanded radially by extension of the ram 37 so as to cause the rollers 46 to be retracted out of engagement with the inner surface of the pipe 98, thereby enabling the rollers 91 of all segments 25–27 to be expanded into engagement with the inner surface of the pipe 98. The clamp 23 thus will exert a radially outward force on the pipe 98 of such magnitude as to reform its end 100 to a substantially circular configuration. The use of a force multiplying linkage to expand the clamp member, coupled with the use of hydraulic fluid, as opposed to air, makes possible the reforming of the ends of pipes of considerable wall thicknesses.

Following reforming of the end 100 of the pipe 98, there may be a greater or lesser hi-lo condition between the confronting ends of the pipes 98 and 99. A hi-lo condition is assured, however, either externally or internally, by reason of the difference in wall thicknesses of the pipes 98 and 99.

Following reforming of the end 100 of the pipe, the clamp 24 may be expanded radially by extension of the ram 59, causing the rollers 91 carried by the segments 47–49 to be urged forcibly into engagement with the inner surface of the pipe 99, thereby reforming its end 101 to match substantially the configuration of the end 100 of the pipe 98. If, following reformation of the end 101 of the pipe 99, the mis-match between the inner surfaces of the two pipes remains the same as is illustrated in FIG. 1, the pipe 99 should be shifted upwardly relative to the pipe 98 by about half the difference between the levels of the inner surfaces of the pipes, thereby substantially aligning the longitudinal axes of the two pipes. This will reduce the hi-lo condition at the upper side of the pipes and introduce a hi-lo condition at the lower side of the pipes, but the extent of the hi-lo condition will be uniform, thereby enabling an acceptable weld to be made. The vertical adjustment of the pipe 99 relative to the pipe 98 is accomplished by simultaneous extension of the rams 67 and 68.

Should it be necessary to shift the pipe 99 downwardly, to the left, or to the right, with respect to the pipe 98, the rams 67 and 68 individually may be extended and contracted sequentially or as may be appropriate to effect the desired adjustment of the pipe 99 to equalize whatever mis-match may exist between the two pipes because of a difference in their wall thicknesses. The pipes 98 and 99 then may be welded to one another in a conventional manner.

Following the welding of the pipe 99 to the pipe 98, the clamps 23 and 24 may be contracted radially, by retraction of the rams 36 and 58, thereby conditioning the carraige for travel through the pipe 99 to its opposite end to enable another length of pipe to be welded to the pipe 99 so as to elongate the pipe string.

The ability of the rollers 91 to be adjusted radially of their respective clamps 23 and 24 enables a single clamp mechanism to be adaptable to pipes of considerably differing diameters. Thus an internal clamp mechanism constructed in accordance with the invention has greater versatility than internal clamps known heretofore.

The disclosed embodiment is representative of a presently preferred form of the invention, but is intended to be illustrative rather than definitive thereof. The invention is defined in the claims.

I claim:

1. Internal pipe clamping apparatus for aligning end to end a pair of confronting pipe lengths extending in prolongation of one another, said apparatus comprising first radially expansible and contractile clamp means; second radially expansible and contractile clamp means; means coupling said first and second clamp means to one another for relative transverse movement therebetween; independently operable first and second power means for radially expanding and contracting said first and second clamp means, each of said clamp means being of such diameter when contracted as to be accommodated within said pipe lengths and each of said clamp means being expansible into engagement with the inner surface of the associated pipe length; and power shifting means acting on at least one of said clamp means for effecting relative bodily transverse movements between said first and second clamp means.

2. Apparatus according to claim 1 wherein each of said clamp means comprises a plurality of arcuate segments joined to one another for radial expansion and contraction.

3. Apparatus according to claim 2 wherein two of said segments are unjoined to each other to provide a gap therebetween.

4. Apparatus according to claim 1 wherein each of said clamp means includes rollers movable into and out of bearing engagement with said pipe lengths.

5. Apparatus according to claim 4 including means mounting said rollers for independent radial adjustment.

6. Apparatus according to claim 1 wherein said power means is pressure fluid operated.

7. Apparatus according to claim 6 wherein said power means is hydraulic.

8. Apparatus according to claim 1 wherein said power means includes a force multiplying linkage.

9. Apparatus according to claim 8 wherein said linkage includes a toggle mechanism.

10. Apparatus according to claim 1 wherein said coupling means comprises a first support carried by said first clamp means and a second support carried by said second clamp means and loosely fitted to said first support.

11. Apparatus according to claim 1 wherein said shifting means comprises a plurality of extensible and retractable fluid pressure rams.

12. Apparatus according to claim 11 wherein said rams are extensible and retractable independently of one another.

13. In an internal pipe clamp for use in aligning end to end a pair of confronting pipe lengths and having a first radially expansible and contractile clamp member movable into and out of clamping engagement with the inner surface of one of said pipe lengths adjacent one end thereof, and a second radially expansible and contractile clamp member movable into and out of clamping engagement with the inner surface of the other of said pipe lengths adjacent that end of the latter which confronts said one end of said first pipe length, the improvement comprising first and second independently operable power operating means for expanding and contracting the respective first and second clamp members into and out of clamping engagement with the respective pipe lengths, means loosely coupling said clamp members for relative bodily transverse movement; and power shifting means for effecting such movement of said clamp members to a selected position of adjustment and maintaining them in said position.

14. An internal pipe clamp according to claim 13 wherein said coupling means includes means for spacing said first and second clamp members axially from one another.

15. An internal pipe clamp according to claim 13 wherein each of said clamp members comprises a plurality of arcuate segments joined to one another for radial expansion and contraction.

16. An internal pipe clamp according to claim 13 wherein each of said clamp members includes rollers movable into and out of bearing engagement with the respective pipe lengths.

17. An internal pipe clamp according to claim 16 including means mounting said rollers for independent radial adjustment.

18. An internal pipe clamp according to claim 13 wherein said power operating means is pressure fluid operated.

19. An internal pipe clamp according to claim 18 wherein said power operating means is hydraulic.

20. An internal pipe clamp according to claim 13 wherein each of said power means includes a force multiplying linkage.

21. An internal pipe clamp according to claim 20 wherein said linkage includes a toggle mechanism.

22. An internal pipe clamp according to claim 13 wherein said power shifting means comprises a plurality of extensible and retractable rams.

23. An internal pipe clamp according to claim 22 wherein said rams are extensible and retractable independently of one another.

* * * * *

UNITED STATES PATENT AND TRADEMARK OFFICE
CERTIFICATE OF CORRECTION

PATENT NO. : 4,463,938
DATED : August 7, 1984
INVENTOR(S) : Timothy C. Dearman

It is certified that error appears in the above-identified patent and that said Letters Patent are hereby corrected as shown below:

Column 2, line 60, after "gauge" insert -- 21 -- .

Column 8, line 50, after "power" insert -- operating -- .

Signed and Sealed this

Eighth Day of January 1985

[SEAL]

Attest:

Attesting Officer

GERALD J. MOSSINGHOFF

*Commissioner of Patents and Trademarks*